United States Patent [19]

Haferl

[11] Patent Number: 4,737,881
[45] Date of Patent: Apr. 12, 1988

[54] RESONANT DEGAUSSING APPARATUS

[75] Inventor: Peter E. Haferl, Adliswil, Switzerland

[73] Assignee: RCA Corporation, Princeton, N.J. Israel

[21] Appl. No.: 853,421

[22] Filed: Apr. 18, 1986

[30] Foreign Application Priority Data

Nov. 10, 1985 [GB] United Kingdom ............... 8525138

[51] Int. Cl.$^4$ ............................................ H01F 13/00
[52] U.S. Cl. ................................................... 361/150
[58] Field of Search ...................................... 361/150

[56] References Cited

U.S. PATENT DOCUMENTS

| 3,733,524 | 5/1973 | Cooksey et al. | 361/150 |
| 3,986,075 | 10/1976 | Manske | 361/150 |
| 4,441,052 | 4/1984 | Willis | 361/150 |
| 4,489,253 | 12/1984 | Godawski | 315/8 |
| 4,535,270 | 8/1985 | Frantz et al. | 315/8 |

FOREIGN PATENT DOCUMENTS 2835611  2/1980  Fed. Rep. of Germany .

OTHER PUBLICATIONS

A Report MRZ-259 of RCA Laboratories Zurich, Switzerland, entitled "Resonance Degaussing" dated Mar. 5, 1980.

Primary Examiner—L. T. Hix
Assistant Examiner—David Porterfield
Attorney, Agent, or Firm—Eugene M. Whitacre, Joseph J. Laks, Sammy S. Henig

[57] ABSTRACT

A degaussing circuit for a cathode ray tube, of a video display apparatus includes a resonating capacitor that is charged prior to degaussing. A degaussing coil is disposed about the cathode ray tube. An SCR, responsive to an on/off control signal, is turned on by a control switch for coupling the resonating capacitor to the degaussing coil in order to generate an AC, degaussing current in the coil having an amplitude that diminishes to a low amplitude during a degaussing interval. Positive feedback is used for speeding up the turn-on time of the control switch. A series pass transistor switch couples a source of a supply voltage to a delay network. The series pass transistor switch is coupled in the current path of the current that is supplied by the power supply. An energizing voltage is developed at the output of the delay network. The magnitude of the energizing voltage exceeds a predetermined value after a predetermined delay time following the closing of the transistor switch, that is determined by the delay network. The delayed energizing voltage is coupled to a deflection circuit to initiate deflection circuit operation after conclusion of the degaussing.

20 Claims, 3 Drawing Sheets

RESONANT DEGAUSSING APPARATUS

This invention relates to degaussing circuits for video display equipment.

Color cathode ray tubes require periodic degaussing or demagnetization to counteract the effects of the earth's magnetic field or of electromagnetic fields produced by nearby electrical devices, such as motors or appliances. These fields may magnetize metallic portions of the cathode ray tube, such as the shadow mask, causing a degradation of the color purity of the tube. Video display apparatus, such as television receivers and computer or video display monitors, usually incorporate a degaussing circuit which is operative when the apparatus is energized to produce an alternating current field that decays toward zero in order to demagnetize the metallic components in the vicinity of the tube and of the tube itself.

A common type of degaussing circuit is powered from the AC line supply, which in the United States has a frequency of 60 Hz. This type of degaussing circuit ordinarily utilizes a positive temperature coefficient resistor, or thermistor, or other temperature sensitive component, which increases in resistance as it heats due to degaussing current flow. This causes the alternating degaussing current to decay in a manner that provides demagnetization of the cathode ray tube metallic components.

Another type of degaussing circuit utilizes a resonant or ring-down degaussing circuit. The resonant degaussing circuit operates by causing a capacitor connected in parallel with the degaussing coil to resonate with the coil in an oscillating manner. The finite Q of the resonant circuit causes the degaussing current to decay in the desired manner to effect demagnetization of the display apparatus metallic parts.

The resonant frequency of the degaussing circuit may be of the order of 2 kHz, so that degaussing is completed in less than 5 milliseconds. This time period is short compared to the vertical deflection interval, so that stray flux from the vertical deflection coils may interfere with the degaussing field resulting in a residual magnetism of the metallic parts of the tube. This may cause purity misregister on the display screen of the tube.

In order to eliminate the problem of such interfering stray vertical fields, the degaussing operation, in some prior art circuits, occurs when the vertical deflection field is close to its minimum value, so that little or no stray field is produced. In such arrangement, a timing signal that is produced from the vertical sync signal of an incoming video signal is used for starting the degaussing operation. The degaussing operation is timed to occur when the vertical deflection field is close to its minimum. Such arrangement may, disadvantageously, utilize a complex circuitry.

In accordance with an aspect of the invention, a degaussing circuit, for a cathode ray tube of a video display apparatus that is capable of displaying the picture information of a video signal, includes a resonating capacitor that is charged prior to a degaussing interval for developing a voltage in the capacitor. A degaussing coil is disposed about the cathode ray tube. A first switch is responsive to a control signal for coupling the resonating capacitor to the degaussing coil in order to generate an AC degaussing current in the coil having an amplitude that diminishes during the degaussing interval. A second switch couples a source of a supply voltage to a delay network. The second switch is coupled in the current path of the current that is supplied by the supply voltage. The second switch is responsive to the control signal for coupling the supply voltage to the delay network to develop a first voltage at an output of the delay network after the end time of the degaussing interval. The first voltage is coupled to a deflection circuit for generating a deflection current in a deflection winding after the end time of the degaussing interval.

Figure 1:
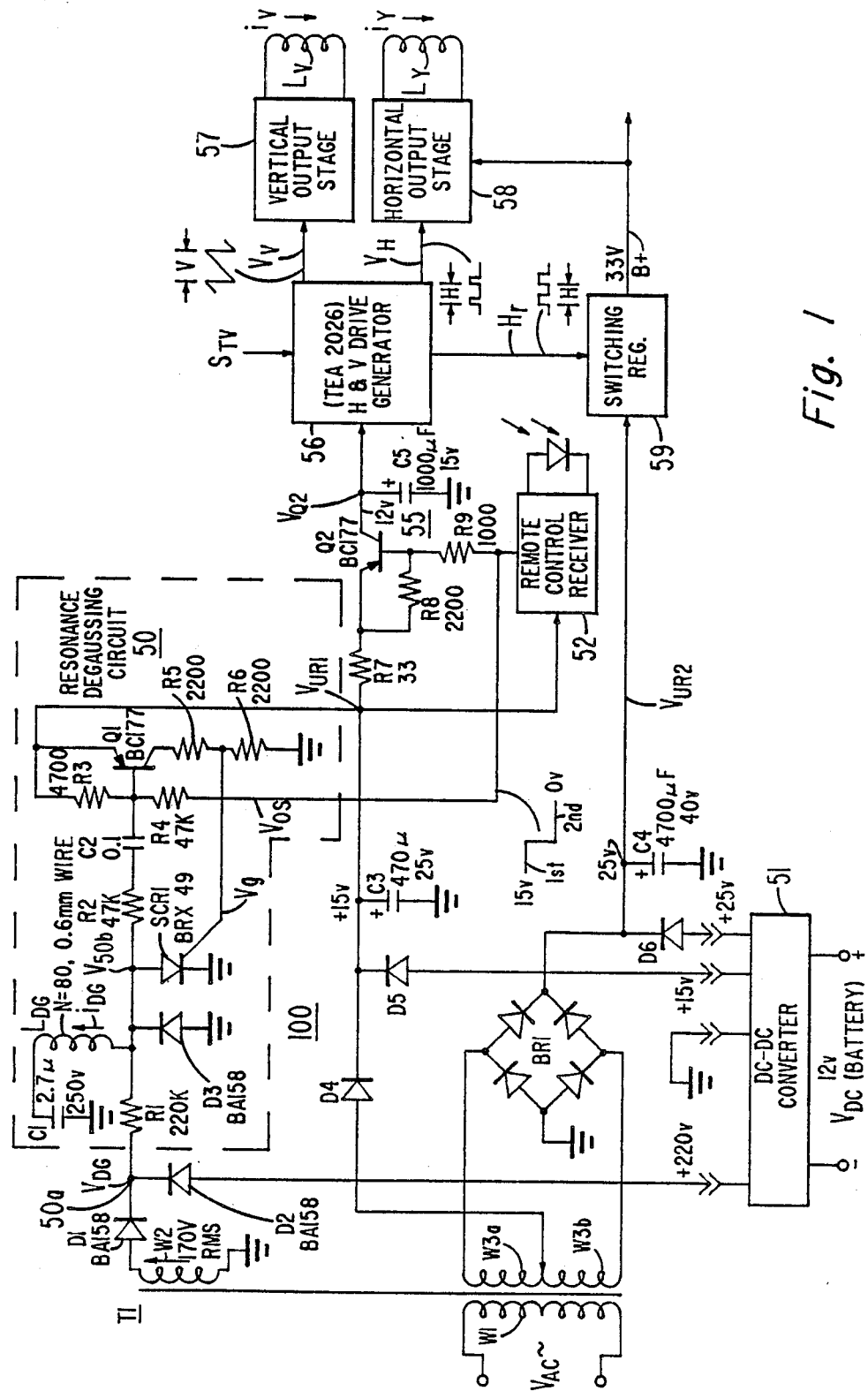
FIG. 1 illustrates a degaussing system embodying an aspect of the invention.

FIG. 1 illustrates a degaussing system 100 embodying an aspect of the invention. Degaussing system 100 may be used in, for example, a television receiver that is not shown in detail in FIG. 1. A remote control receiver 52 of the television receiver is responsive to user initiated commands coupled, for example, via an infrared transmission link.

During operation in a standby mode of the television receiver, remote control receiver 52 generates an on/off signal $V_{OS}$ in a first or "off" state that prevents the occurrence of both horizontal and vertical scanning, as described later on. Upon receiving a user initiated "on" command via the infrared transmission link, remote control receiver 52 generates on/off signal $V_{OS}$ at a second or "on" state that initiates degaussing.

The television receiver can be energized by a source of AC mains voltage $V_{AC}$ or, alternately, by a source of a DC voltage $V_{DC}$, such as a battery. Degaussing is provided to a cathode ray tube such as, for example, Hitachi 250 ATB22 of the television receiver when either voltage $V_{AC}$ or voltage $V_{DC}$ is used for energizing the television receiver.

When degaussing system 100 operates from DC voltage $V_{DC}$, a DC-to-DC converter 51 that is energized by voltage $V_{DC}$ supplies, via a diode D2 a DC voltage $V_{DG}$ to a terminal 50a of a resistor R1. The other terminal of resistor R1, terminal 50b, is coupled to a degaussing coil $L_{DG}$ that is coupled in series with a resonating capacitor C1. The other plate of capacitor C1 that is remote from coil $L_{DG}$ is at ground potential. The cathode electrode of a diode D3 is coupled to terminal 50b. The anode electrode of diode D3 is coupled to around, the common conductor. Diode D3 conducts a degaussing current $i_{DG}$ that flows in coil $L_{DG}$ and capacitor C1 when current $i_{DG}$ is, illustratively, positive. A silicon controlled rectifier switch SCR1 is coupled in parallel with diode D3 between terminal 50b and ground. Switch SCR1 conducts degaussing current $i_{DG}$ when current $i_{DG}$ is at the opposite, or negative polarity. Switch SCR1 is conductive when a voltage $V_g$ at the gate electrode of switch SCR1 is positive. As described later on, voltage $V_g$ becomes positive when on/off signal $V_{OS}$ changes from the "off" to the "on" state. When on/off signal $V_{OS}$ is in the "off" state, switch SCR1 is nonconductive and capacitor C1 is charged via a large valued resistor R1 to a voltage that is equal to voltage $V_{DG}$.

Figure 2:
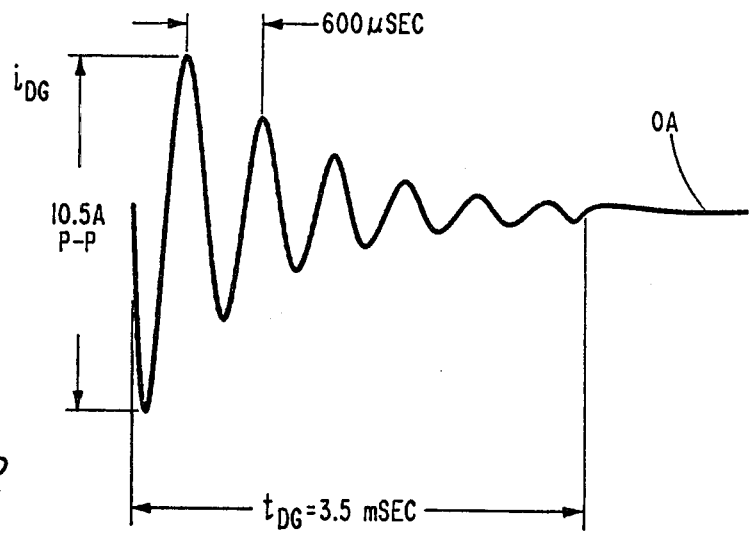
FIG. 2 illustrates the waveform degaussing current in the circuit of FIG. 1.

When voltage $V_g$ becomes positive, switch SCR1 conducts. When switch SCR1 conducts, terminal 50b is coupled to ground, thus placing degaussing coil $L_{DG}$ across resonating capacitor C1. The charge stored in resonating capacitor C1 prior to degaussing establishes, in a known manner, a ringing current $i_{DG}$ such as shown in FIG. 2 that flows in capacitor C1 of FIG. 1 and in degaussing coil $L_{DG}$, for degaussing the picture tube. Current $i_{DG}$ produces a degaussing force of illustratively, 320 amper-turns peak-to-peak.

Because of the finite value of the Q of the resonant degaussing circuit, the energy losses cause the amplitude of current $i_{DG}$ to decay to substantially zero after a degaussing period $t_{DG}$ of, illustratively, 3.5 miliseconds elapses. During period $t_{DG}$ several cycles of current $i_{DG}$ occur that are sufficient to provide degaussing.

Since resistor R1 of FIG. 1 is large, the current in resistor R1 that flows when switch SCR1 is conductive is small and below the holding current value of the SCR. Switch SCR1 remains conductive as long as voltage $V_g$ is positive. Voltage $V_g$ is positive as long as on/off signal $V_{OS}$ is in the "on" state, as described later on. On/off signal $V_{OS}$ is in the "on" state as long as the television receiver is operating in the normal operation mode.

A supply voltage $V_{UR1}$ is coupled via a diode D5 to a terminal 54a of a resistor R7. The emitter electrode of a transistor switch Q1 is coupled to terminal 54a for developing voltage $V_{UR1}$ at the emitter electrode. The collector electrode of transistor Q1 is coupled to ground via a resistor R5 that is in series with a resistor R6. Gate voltage $V_g$ of switch SCR1 is developed at a junction terminal between resistors R5 and R6. On/off signal $V_{OS}$ is coupled via a resistor R4 to the base electrode of transistor switch Q1 for controlling the operation of switch Q1.

In standby mode, when on/off signal $V_{OS}$ is in the "off" state, signal $V_{OS}$ is sufficently positive to turn off transistor switch Q1. Therefore, voltage $V_g$ is zero, switch SCR1 is nonconductive and capacitor C1 is charged to a voltage that is equal to voltage $V_{DG}$. Switch SCR1 becomes nonconductive because switch SCR1 current that is supplied via resistor R1 is lower than the holding current of switch SCR1.

Immediately after on/off signal $V_{OS}$ changes from the "off" to the "on" state, signal that becomes less positive than voltage $V_{UR1}$ at the emitter electrode of switch Q1 causes transistor switch Q1 to conduct. When transistor switch Q1 begins conducting, voltage $V_g$ becomes positive, causing switch SCR1 to become conductive and a voltage $V_{50b}$ at terminal 50b to have a negative going transition.

In accordance with an aspect of the invention, the negative going transition of voltage $V_{50b}$ is coupled via a capacitor C2 to the base electrode of transistor switch Q1, causing the base voltage of transistor switch Q1 to become less positive. When the base voltage of transistor switch Q1 becomes less positive, both the emitter and collector currents of transistor switch Q1 increase. Thus, capacitor C2 provides positive feedback that causes transistor switch Q1 to turn on faster. It follows that because of the positive feedback that is provided by capacitor C2, switch SCR1 also, advantageously is turned on faster.

As explained before, oscillations of current $i_{DG}$ in degaussing coil $L_{DG}$ and in resonating capacitor C1 begin when switch SCR1 becomes conductive. The peak amplitude of current $i_{DG}$ in the first cycle of oscillation is larger if switch SCR1 is turned on faster. Thus, for a given voltage $V_{DG}$ the magnitude of the degaussing current $i_{DG}$ can be, advantageously, increased by using the positive feedback of capacitor C2 that causes switch SCR1 to turn on faster. The faster increase of voltage $V_g$ protects also switch SCR1. For example, voltage $V_{OS}$ that ramps down slowly, causes voltage $V_g$ to increase slowly, resulting in gate triggering that may be insufficient and that may damage silicon controlled rectifier switch SCR1.

Voltage $V_{UR1}$ at terminal 54a is coupled through a resistor R7 of a delay circuit 55 to the emitter electrode of a transistor switch Q2. A capacitor C5 of delay circuit 55 is coupled to the collector electrode of transistor switch Q2. Capacitor C5 comprises a filter capacitor of a voltage $V_{Q2}$ that is developed across capacitor C5 and that energizes a horizontal and vertical drive generator 56. On/off signal $V_{OS}$ that controls also the switching operation of switch Q2 is coupled to the base electrode of transistor switch Q2 through a resistor R9.

During standby mode, signal $V_{OS}$ that is at the "off" state is, illustratively, equal to voltage $V_{UR1}$. Therefore, transistor switch Q2 is nonconductive. When the user wishes to turn on the television receiver, the user sends a corresponding command to remote control receiver 52 that causes on/off signal $V_{OS}$ to change state to the "on" state. Immediately after signal $V_{OS}$ changes to the "on" state, transistor switch Q2 becomes conductive and capacitor C5 of delay circuit 55 begins being charged via resistor R7. The time constant of resistor R7 and capacitor C5 is substantially longer than the degaussing period $t_{DG}$ of FIG. 2. Therefore, as described in detail later on, generator 56 begins normal operation after a delay time.

Generator 56 that is energized by voltage $V_{Q2}$ receives a composite video signal $S_{TV}$, coupled from for example, the video detector of the television receiver that is not shown in the figures. Generator 56 generates from signal $S_{TV}$ an output control signal $V_v$ having a period V that is equal in the PAL standard approximately to 20 milliseconds and an output control signal $V_H$, that is equal in the PAL standard approximately to 64 microseconds. Signals $V_v$, and $H_v$ are coupled to the corresponding input terminals of a vertical output stage 57 and a horizontal output stage 58, respectively. Output stage 57 generates, in accordance with signal $V_v$, a vertical deflection current $i_v$. Similarly, output stage 58 generates, in accordance with signal $H_v$, a horizontal deflection current $i_Y$ in a horizontal deflection winding $L_y$.

Generator 56 of FIG. 1 also generates a horizontal rate output signal Hr that is coupled to a switching regulator 59 that generates a regulated voltage B+. Regulated voltage B+ provides the energizing voltage to horizontal output stage 58.

In order to generate in generator 56 signals $V_y$ and $H_v$ at amplitudes that are required for generating deflection currents $i_v$ and $i_Y$, voltage $V_{Q2}$ that provides power to generator 56 has to exceed a nominal level. As long as voltage $V_{Q2}$ is below the nominal level, signal $V_v$ is not generated; therefore, the corresponding vertical deflection current $i_v$ is zero.

In accordance with an aspect of the invention, the delay time between voltage $V_{Q2}$ and signal $V_{OS}$ caused by resistors R7 and capacitor C5 causes voltage $V_{Q2}$ to be below the nominal level throughout the degaussing period $t_{DG}$ of FIG. 2. Thus, degaussing terminates prior to the time in which vertical deflection current $i_v$ of FIG. 1 is generated. Therefore, the alternating current magnetic field that is generated by degaussing coil $L_{DG}$ decays prior to the formation of the vertical deflection magnetic field. It follows that, advantageously, the vertical deflection field that remains zero during interval $t_{DG}$, does not cause residual magnetism of the metallic parts of the cathode ray tube.

In accordance with a feature of the invention, voltage B+ that energizes output stage 58 and other signal processing circuits of the television receiver, not shown in FIG. 1, is generated after degaussing ceases.

Figure 3:
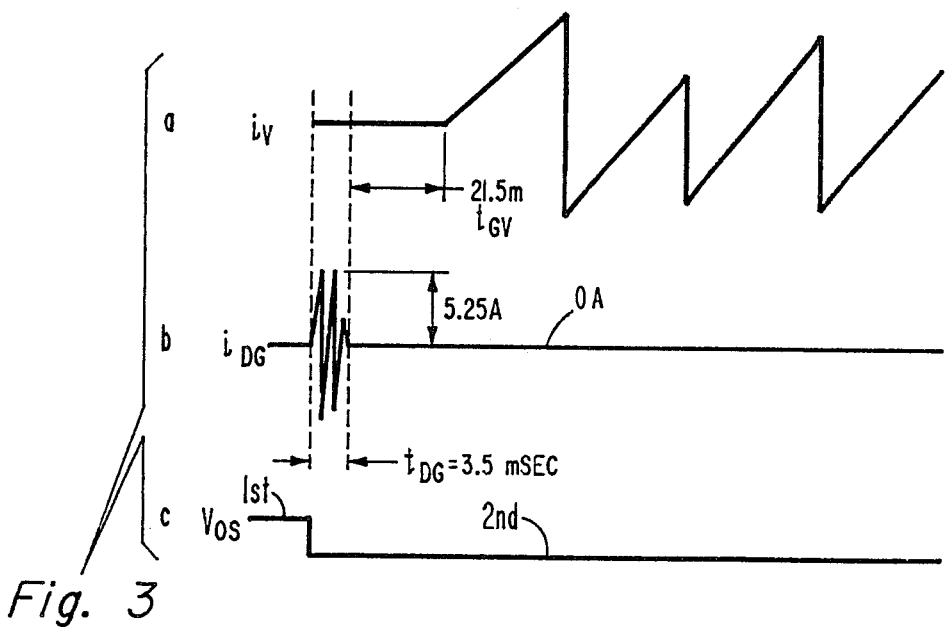
FIGS. 3a–3c illustrate waveforms useful in explaining the operation of the degaussing system of FIG. 1.

FIGS. 3a-3c illustrate the waveforms of vertical deflection current $i_v$, degaussing current $i_{DG}$ and on/off signal $V_{OS}$, respectively. Similar numbers and symbols in FIGS. 1, 2 and 3a-3c indicate similar items or functions. FIG. 2b shows that degaussing current $i_{DG}$, that is initated by signal $V_{OS}$ of FIG. 3c, decays to substantially zero amperes an interval $t_{GV}$ that is approximately 21.5 milliseconds prior to the time in which vertical deflection current $i_v$ of FIG. 3a is generated. The length of interval $t_{GV}$ is determined by capacitor C1 and resistor R7. Advantageously, capacitor C5 fulfills two different requirements. The first, it provides filtering. The second, it delays voltage $V_{Q2}$. Thus, delaying current $i_v$ is obtained without adding additional components.

When AC voltage $V_{AC}$ is coupled across a primary winding of a transformer T1, voltage $V_{DG}$ is generated by half-wave rectifying the voltage across a secondary winding W2 of transformer T1 by a diode D1. When voltage $V_{AC}$ is applied, diode D1 generates voltage $V_{DG}$ and diode D2 is back biased. On the other hand, when voltage $V_{DC}$ is applied diode D2 provides voltage $V_{DG}$ and diode D1 is back biased. Thus, diodes D1 and D2 form a wired inclusive "or" arrangement that isolates DC-to-DC converter 51 from transformer T1 when voltage $V_{AC}$ is applied and that isolates transformer T1 from converter 51 when voltage $V_{DC}$ is applied. A similar arrangement is used for generating voltage $V_{UR1}$ by utilizing the wired inclusive "or" arrangement of diodes D4 and D5. Likewise, a bridge rectifier BR1 supplies a voltage $V_{UR2}$ that energizes remote control receiver 52 and power regulator 59 when voltage $V_{AC}$ is applied. Whereas, a diode D6 supplies voltage $V_{UR2}$ when voltage $V_{DC}$ is applied. Thus, degaussing system 100 is advantageously capable of providing degaussing when the television receiver operates from a DC source such as a battery or from an AC source line voltage.

Figure 4:
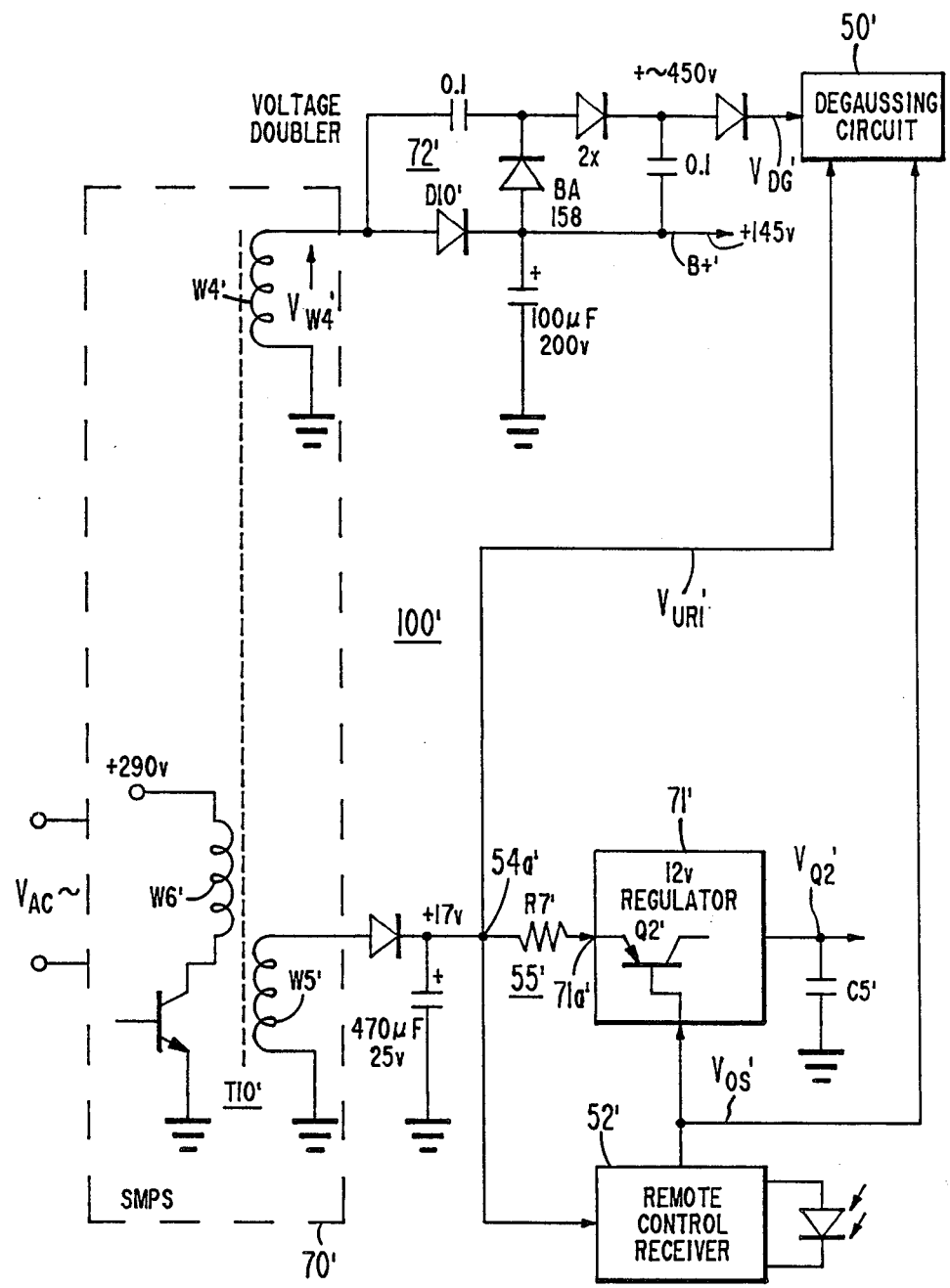
FIG. 4 illustrates a second embodiment of the invention.

FIG. 4 illustrates a degaussing system 100' embodying another aspect of the invention that obtains the energizing voltages by rectifying the voltages at secondary windings of a transformer of a switch mode power supply 70'. Similar numbers and symbols in FIGS. 1 and 4 indicate similar numbers or items.

Referring to degaussing system 100' of FIG. 4, an AC voltage $V_{W4}'$ across a secondary winding W4' of an output transformer T10' of switch mode power supply 70' is rectified and stepped-up in a conventionally constructed voltage doubler 72' to provide degaussing voltage $V_{DG}'$ that is equal to approximately the sum of voltage B+ and the peak-to-peak voltage of voltage $V_{W4}$ across winding W4'. It should be understood that step-up ratios larger than two can be similarly obtained.

In degaussing system 100' resistor R7' is coupled to an input terminal 71a' of a voltage regulator 71' that includes, for example, an input switch Q2'. Switch Q2' couples voltage $V_{UR1}'$ to the regulating stages of regulator 71' that generates output voltage $V_{Q2}'$ across capacitor C5'. Voltage $V_{Q2}'$ supplies the energizing voltage to a conventional vertical output stage that is not shown in FIG. 4. Thus, capacitor C5' is the required filter capacitor of regulator 71'. Capacitor C5' also provides the capacitive portion of delay circuit 55' that operates, as described before, in a manner similar to delay circuit 55 of degaussing system 100 of FIG. 1.

What is claimed:

1. A degaussing circuit for a cathode ray tube of a video display apparatus, comprising:
   a resonating capacitor;
   first means for developing a voltage across said capacitor prior to a degaussing interval;
   a degaussing coil that is disposed about said cathode ray tube;
   a source of a control signal;
   a first switch responsive to said control signal for coupling said resonating capacitor to said degaussing coil for generating an AC, degaussing current in said coil having an amplitude that diminishes to a low value during said degaussing interval;
   a source of a supply voltage;
   a delay network;
   a second switch, responsive to said control signal and coupled in a current path of current that is supplied by said source of said supply voltage, for coupling said supply voltage to said delay network to develop at an output of said delay network a delayed supply voltage that is delayed until after at least a substantial portion of said degaussing interval has occurred; and
   second means responsive to said delayed supply voltage for generating a deflection current in a deflection winding when said delayed supply voltage is developed such that during said portion of said degaussing interval the generation of said deflection current is prevented.

2. A circuit according to claim 1 wherein said delay network comprises an R-C network having a time constant that determines the delay of said delay network for developing said delayed supply voltage in a capacitor of said R-C network.

3. A circuit according to claim 2 wherein said capacitor of said R-C network comprises a filtering capacitance that filters said delayed supply voltage.

4. A circuit according to claim 2 wherein said R-C network comprises a resistor that provides current limiting to the current that is supplied from said source of said supply voltage.

5. A circuit according to claim 1 wherein said deflection current generating means generates, in accordance with said delayed supply voltage, said deflection current at a vertical rate after a delay time that is determined by said delayed supply voltage.

6. A circuit according to claim 5 wherein said deflection current generating means generates, in accordance with said delayed supply voltage, a second deflection current at a horizontal rate.

7. A circuit according to claim 1 wherein said source of control signal comprises a remote control apparatus for said video display apparatus that generates said control signal in accordance with a user initiated command.

8. A circuit according to claim 1 wherein said second switch comprises a series pass transistor of a power regulator that regulates said delayed supply voltage.

9. A circuit according to claim 1 wherein said first means comprises a source of an AC third voltage and a voltage doubler that is coupled to said source of said third voltage for developing, in accordance with said third voltage, a voltage that is substantially higher than the peak voltage of said third voltage and that is coupled to said resonating capacitor for developing said voltage across said resonating capacitor.

10. A circuit according to claim 1 wherein said first means comprises a source of an AC third voltage, a source of a DC voltage, a DC-to-DC voltage converter coupled to said source of said DC voltage for generating a higher DC voltage and means for selectively coupling only one of said AC third voltage and said higher DC voltage to said resonating capacitor.

11. A circuit according to claim 10 wherein said selectively coupling means comprises first and second rectifiers that couple the greater of said AC third and higher DC voltages, respectively, to said resonating capacitance.

12. A circuit according to claim 11 wherein said first rectifier rectifies said third voltage for developing from the rectified voltage said voltage across said resonating capacitor.

13. A circuit according to claim 1 wherein said first switch comprises a silicon controlled rectifier that couples said resonating capacitor to said degaussing coil when said silicon controlled rectifier is conductive.

14. A circuit according to claim 13 wherein said first means comprises a source of a third supply voltage, and a resistor that is coupled to said source of said third supply voltage and to said silicon controlled rectifier for developing said voltage across said resonating capacitor in accordance with said third supply voltage when said silicon controlled rectifier is nonconductive.

15. A circuit according to claim 14 wherein a current that flows in a current path that include said resistor and said silicon controlled rectifier when said silicon controlled rectifier is conductive is lower than the holding current of said silicon controlled rectifier such that said silicon controlled rectifier becomes nonconductive at a time that is determined in accordance with the voltage at the gate electrode thereof.

16. A circuit according to claim 13 wherein said first switch further comprises a transistor responsive to said control signal that is coupled to a control electrode of said transistor such that said transistor couples said supply voltage to the gate electrode of said silicon controlled rectifier when said transistor is conductive, and an impedance coupled to a terminal that is between said degaussing coil and a current conducting electrode of said silicon controlled rectifier and to said control electrode of said transistor, wherein said impedance forms a positive feedback path to speed up, in accordance with the voltage at said terminal, a transition time during which said silicon controlled rectifier is being turned on.

17. A degaussing circuit for a cathode ray tube of a video display apparatus, comprising:
a resonating capacitor;
first means for developing a voltage across said capacitor prior to a degaussing interval;
a degaussing coil that is disposed about said cathode ray tube and coupled to said capacitor to form a degaussing arrangement;
a source of a control signal; and
a first switch responsive to said control signal for coupling said resonating capacitor to said degaussing coil for generating an AC, degaussing current in said coil having an amplitude that diminishes to a low value during said degaussing interval, said first switch having a control terminal that is coupled to said degaussing arrangement by a signal path that provides positive feedback so as to speed-up a switching transition time of said first switch.

18. A circuit according to claim 17 further comprising a source of a supply voltage, a second switch, responsive to said control signal and coupled in a current path of current that is supplied by said source of said supply voltage and a delay network wherein said second switch couples said supply voltage to said delay network to develop at an output of said delay network a delayed supply voltage that is delayed until after at least a substantial portion of said degaussing interval has occurred, said delayed supply voltage being coupled to a deflection apparatus for generating a deflection current in a deflection winding when said delayed supply voltage is developed such that during said portion of said degaussing interval the generation of said deflection current is prevented.

19. A circuit according to claim 18 wherein said first switch comprises a thyristor, further comprising a thyristor control switch responsive to said control signal and having an output terminal coupled to a control terminal of said thyristor and an input terminal coupled to an output terminal of said thyristor via said signal path that provides positive feedback.

20. A degaussing circuit for a cathode ray tube of a video display apparatus, comprising:
a resonating capacitor;
first means for developing a voltage across said capacitor prior to a degaussing interval;
a degaussing coil that is disposed about said cathode ray tube;
a source of a control signal;
a first switch responsive to said control signal for coupling said resonating capacitor to said degaussing coil for generating an AC, degaussing current in said coil having an amplitude that diminishes to a low value during said degaussing interval;
a source of a supply voltage;
a delay network;
a second switch, responsive to said control signal and coupled in a current in a current path of current that is supplied by said source voltage to said delay network to develop at an output of said delay network a delayed supply voltage that is delayed until after at least a substantial portion of said degaussing interval has occurred;
second means responsive to said delayed supply voltage for generating a drive control signal at a frequency that is related to a deflection frequency when said delayed supply voltage is developed such that the generation of said drive signal is delayed until after said substantial portion of said degaussing interval has occurred; and
a deflection circuit output stage responsive to said drive signal and coupled to a deflection winding for generating a deflection current in said deflection winding when said drive signal is generated such that the delay of said drive signal delays the generation of said deflection current until after said substantial portion of said degaussing interval has occurred.

* * * * *